United States Patent
Settineri

(10) Patent No.: US 9,291,213 B2
(45) Date of Patent: Mar. 22, 2016

(54) PNEUMATIC CLUTCH WITH IMPROVED FRICTION MEMBER

(75) Inventor: Samuel E. Settineri, Marshall, MI (US)

(73) Assignee: Borg Warner Inc., Auburn Hills, MI (US)

( * ) Notice: Subject to any disclaimer, the term of this patent is extended or adjusted under 35 U.S.C. 154(b) by 221 days.

(21) Appl. No.: 13/817,532

(22) PCT Filed: Aug. 4, 2011

(86) PCT No.: PCT/US2011/046551
§ 371 (c)(1),
(2), (4) Date: Feb. 18, 2013

(87) PCT Pub. No.: WO2012/024093
PCT Pub. Date: Feb. 23, 2012

(65) Prior Publication Data
US 2013/0140128 A1  Jun. 6, 2013

Related U.S. Application Data

(60) Provisional application No. 61/374,259, filed on Aug. 17, 2010.

(51) Int. Cl.
*F16D 25/06* (2006.01)
*F16D 25/0632* (2006.01)
*F16D 25/08* (2006.01)

(52) U.S. Cl.
CPC .......... *F16D 25/0632* (2013.01); *F16D 25/082* (2013.01)

(58) Field of Classification Search
USPC ........... 192/66.21, 66.22, 85.21, 85.22, 85.37
See application file for complete search history.

(56) References Cited

U.S. PATENT DOCUMENTS

| 1,195,762 | A | * | 8/1916 | Abernethy | 192/52.3 |
| 1,266,189 | A | * | 5/1918 | Younie | 192/66.21 |
| 2,090,411 | A | * | 8/1937 | Eason | 192/66.22 |
| 2,228,622 | A | * | 1/1941 | Emrick | 192/51 |
| 2,902,130 | A | * | 9/1959 | Halberg et al. | 192/107 R |
| 4,202,432 | A | * | 5/1980 | Komori | 192/107 M |
| 4,271,652 | A | * | 6/1981 | Svensson | 52/478 |
| 5,143,192 | A | * | 9/1992 | Vojacek et al. | 192/107 M |

(Continued)

FOREIGN PATENT DOCUMENTS

GB    542578  *  1/1942

*Primary Examiner* — Ramya Burgess
*Assistant Examiner* — David Morris
(74) *Attorney, Agent, or Firm* — Harness, Dickey & Pierce, P.L.C.; John Artz, P.C.

(57) ABSTRACT

A clutch assembly comprising a clutch housing, a central piston chamber positioned therein and a translatable clutch piston movable between a piston neutral and activated positions in response to air pressure. A rotating drive shaft member is positioned within the clutch housing. A cone clutch friction member is moved from a clutch engaged position to a clutch disengaged position in response to the translatable clutch piston moving between the piston neutral and activated positions. The cone clutch friction member engages the rotating drive shaft when in the clutch engaged position. A clutch spring biases the cone clutch friction member into the clutch engaged position with a clutch engagement force. The cone clutch friction member comprises a V-shaped member with a hollow or solid core, or a bent metal member. Friction material is positioned on at least the surfaces which engage and make contact with the rotating drive shaft member.

23 Claims, 3 Drawing Sheets

(56) References Cited

U.S. PATENT DOCUMENTS

| | | | |
|---|---|---|---|
| 6,237,432 B1* | 5/2001 | Vilou | 74/7 C |
| 7,100,544 B1* | 9/2006 | Wayman | 123/41.12 |
| 7,137,362 B1* | 11/2006 | Settineri | 123/41.12 |
| 7,438,169 B2* | 10/2008 | Swanson et al. | 192/85.21 |
| 7,731,996 B2 | 6/2010 | Bruce et al. | |
| 8,360,219 B2* | 1/2013 | Swanson | 192/66.22 |
| 2002/0167402 A1* | 11/2002 | Trenado et al. | 340/454 |
| 2003/0141163 A1* | 7/2003 | Doremus et al. | 192/70.25 |
| 2006/0081124 A1* | 4/2006 | Clayton et al. | 92/169.1 |
| 2006/0096831 A1* | 5/2006 | Settineri | 192/66.2 |
| 2006/0151278 A1* | 7/2006 | Settineri | 192/91 A |
| 2007/0029157 A1* | 2/2007 | Roche | 192/107 M |
| 2007/0131514 A1* | 6/2007 | Settineri | 192/91 A |
| 2009/0008208 A1* | 1/2009 | Uhl | 192/105 BA |
| 2009/0038906 A1* | 2/2009 | Nishimura et al. | 192/85 AA |
| 2010/0078283 A1* | 4/2010 | Ledetzky et al. | 192/53.362 |
| 2011/0180362 A1* | 7/2011 | Swanson | 192/66.1 |
| 2011/0239417 A1* | 10/2011 | Yu | 24/518 |

* cited by examiner

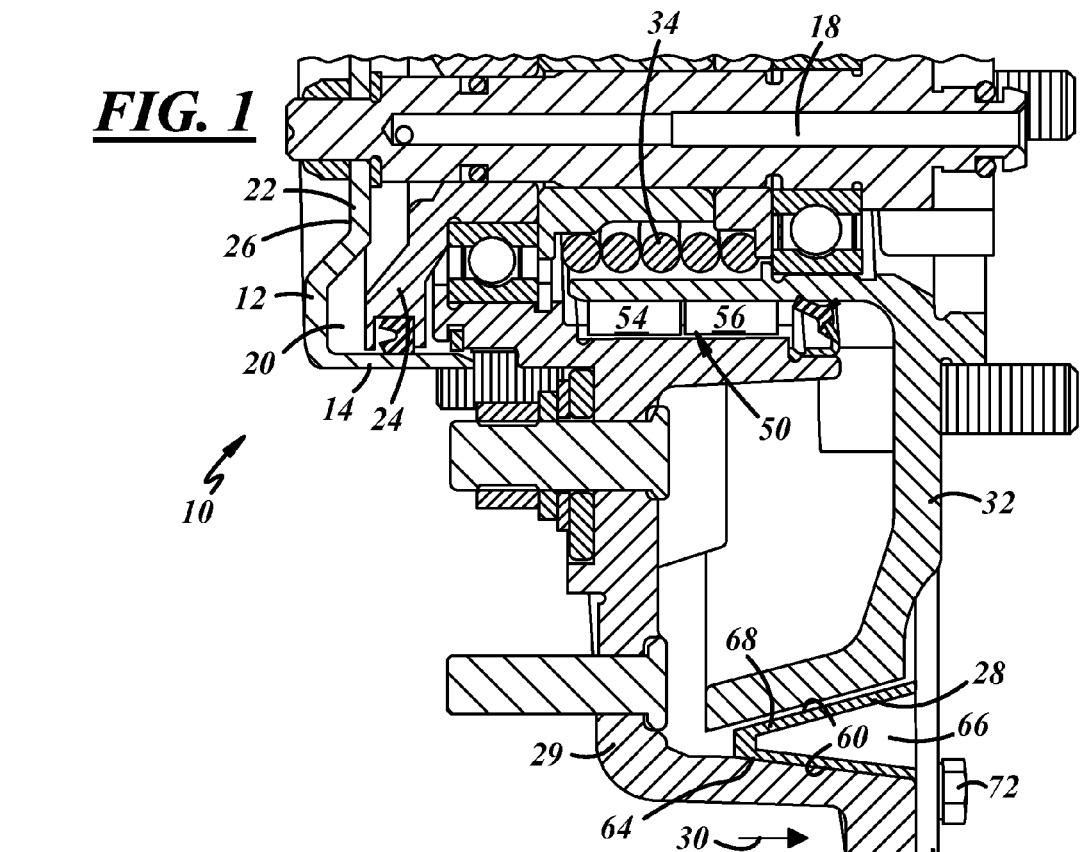

PNEUMATIC CLUTCH WITH IMPROVED FRICTION MEMBER

TECHNICAL FIELD

The present invention relates generally to a fan clutch and more particularly to a fan clutch which has more torque and capacity and which is less expensive to manufacture.

BACKGROUND OF THE INVENTION

Vehicle engines commonly utilize cooling assemblies to remove excess heat from the engine and maintain an optimal operating temperature. The cooling assembly pumps a coolant through the engine and other components in order to control engine temperature. Heat generated within the engine and other components is absorbed by the coolant and dispersed into the surrounding atmosphere through the use of a radiator. In order to improve dispersal by the radiator, it is common to utilize fan assemblies to draw or force air past the radiator to assist in temperature transmission.

It is not always desirable for such fan assemblies to be run continuously. At times, it is desirable for the temperature within the coolant to increase rather than decrease. Additionally, continuous operation when unnecessary places an non-required draw on the engine and thereby reduces efficiency. To compensate for this, present fan assemblies utilize fan clutch assemblies that allow for the selective engagement of the fan to the engine such that the fans are engaged only when necessary. The fan clutch assemblies may be operated in a host of configurations including hydraulic and air-pressure actuated. It is common for these systems to be biased towards fan operation such that when failure occurs in the clutch assembly, the fan continuously operates to keep the engine cool.

An issue with these fan assemblies and associated clutch assemblies stems from their location within the engine compartment. These assemblies must share space within the compartment with a wide variety of engine related systems. The assemblies, therefore, can be placed under severe dimensional restraints. However, fan clutch drives are commonly dimensionally constrained by the internal workings of the clutch which limits reduction of the drive assembly. This dimensional constraint, especially realized in clutch length, limits the applications wherein a pneumatic clutch can be utilized.

It would therefore be highly desirable to have pneumatic clutch fan assembly with increased strength, torque and/or capacity without significantly changing its external size or shape. It would further be highly desirably for such a clutch assembly to be less expensive relative to components and materials utilized.

SUMMARY OF THE INVENTION

It is therefore an object to the present invention to provide an clutch assembly with increased performance without increasing size or shape. It is further an object of the present invention to provide a clutch assembly which is less expensive.

In accordance with the objects of the present invention, clutch assemblies are provided with improved friction members, less expensive friction members, and increased performance. A central piston chamber is positioned therein and feeds a pressure chamber. A translatable clutch piston is in communication with the pressure chamber and is movable between a piston neutral and activated positions in response to air pressure fed into the pressure chamber. A rotating drive shaft is positioned within the clutch housing. A cone clutch element is moved from a clutch engaged position against a friction member to a clutch disengaged position in response to the translatable clutch piston moving between the neutral and activated positions. The cone clutch element engages the rotating drive shaft when in the clutch engaged position. A clutch spring biases the cone clutch element into the clutch engaged position with a clutch engagement force.

New less expensive friction ring members are provided for engagement with the cone clutch element. The friction ring member can consist of a solid or hollow inorganic core on which the friction material is molded or otherwise applied to form a layer on the core with or without air gaps in the friction material. The core of the friction ring can also be a metal stamping or formed element having a V-shape with friction liner material on the outer and inner diameters. In another embodiment, the friction ring can be replaced with a bent retaining plate held in place by a fastener and having the mating surface covered with friction material. With any of these new friction ring embodiments, the clutch element can be provided with an extended radial length. This can provide a clutch with greater strength and greater torque and capacity, without increasing or changing the exterior size or shape of the clutch assembly.

With a stronger clutch with more torque, the clutch assembly can be used in more applications and with larger cooling fans.

Other objects and features of the present invention will become apparent when viewed in light of the detailed description and preferred embodiments when taken in conjunction with the attached drawings and claims.

BRIEF DESCRIPTION OF THE DRAWINGS

FIG. 1 is an illustration of a cone clutch fan drive in accordance with a first embodiment of the present invention, the clutch assembly illustrated in the clutch disengaged position; and FIG. 2 illustrates the cone clutch fan drive of FIG. 1 with the clutch assembly illustrated in the clutch engaged position.

DESCRIPTION OF PREFERRED EMBODIMENTS

Figure 3:
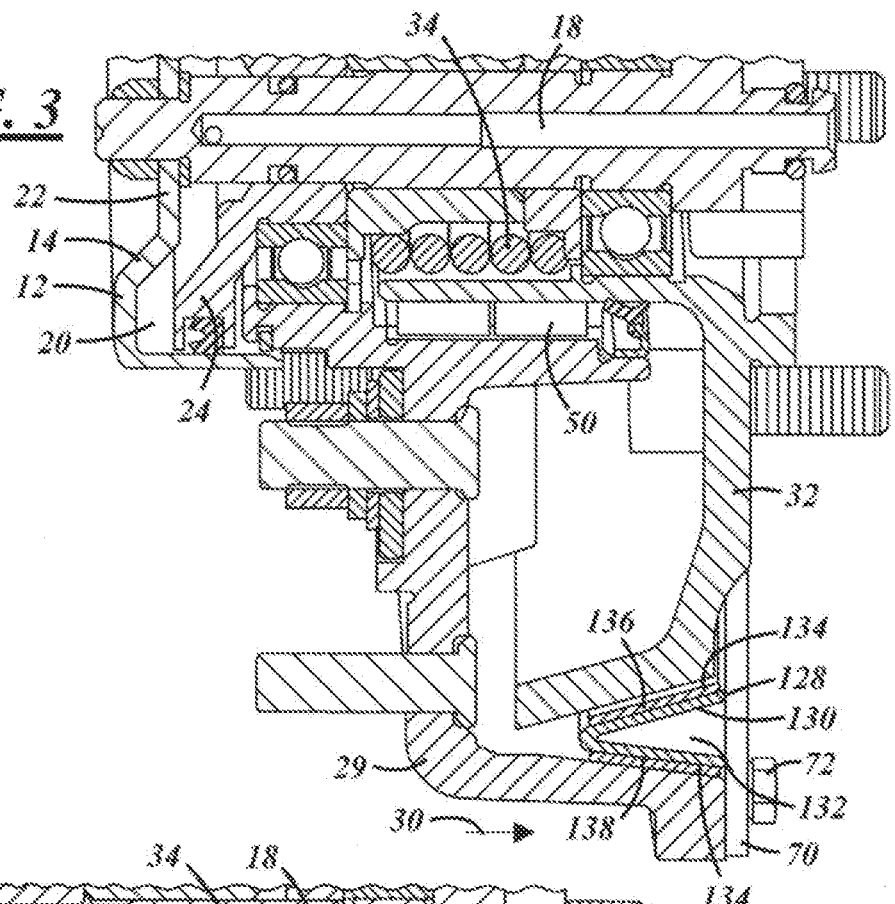
FIG. 3 illustrates a cone fan drive in accordance with a second embodiment of the present invention, the clutch assembly illustrated in the clutch disengaged position.

Referring now to FIG. 1 which is a cone clutch fan drive assembly 10 in accordance with a first embodiment of the present invention. The fan drive assembly 10 includes a clutch assembly 12 having a clutch housing 14. The present invention provides novel and valuable improvements to the clutch assembly 12 that reduces the cost of the assembly and can provide a stronger assembly with more torque and capacity without changing the exterior size and shape of the assembly.

The components and operation of the clutch assembly 12 are similar to the clutch assembly shown and described in U.S. patent application Ser. No. 10/905,505 entitled "Reduced Axial Length Airactuated Cone Clutch Fan Drive"

and filed on Jan. 7, 2005, and patent application Ser. No. 11/675,156 filed on Feb. 15, 2007. Thus, many of the components contained in the clutch assembly utilized herewith, as well as the basic operation thereof, do not need to be discussed and reference is made to those two other applications for a further discussion and description of them.

In addition, since the cross-section of the clutch assemblies shown in the drawings are symmetrical on either side of center line 15, only one half of the structure needs to be described and illustrated herein. The centerline 15 is also the longitudinal axis of the clutch assemblies.

The clutch actuating assembly 12 includes a central piston chamber 18 positioned within the chamber cap 22. Preferably positioned along the centerline of the drive assembly 10, the central piston chamber 18 provides a pathway through the clutch actuating assembly 12 through which pressurized air may be selectively passed. The pressurized air passes through the central piston chamber 18 and into a pressure chamber 20 formed between a chamber cap 22 and a translatable clutch piston 24. When air pressure is supplied, the pressure chamber 20 becomes pressurized and the translatable clutch piston 24 is moved into a piston activated position 26 as shown in FIG. 1. In this position 26, the translatable clutch piston 24, which is in operable communication with a cone-shaped clutch friction member 28, moves the clutch friction member 28 into a clutch disengaged position (see arrow 30). The cone clutch friction member 28 is attached to a steel housing 29 which, in turn, is attached to the translatable clutch piston 24. When in the clutch disengaged position (FIG. 1), the cone clutch member 28 disengages from the rotating drive shaft member 32 such that the rotating drive shaft member 32 rotates independently from the cone clutch friction member 28.

The cone clutch friction member travels axially only a small distance between the engaged and disengaged positions. In operation, the travel of the cone clutch friction member can be on the order of 0.05-0.15 inches.

A clutch spring 34 positioned within the clutch housing 14 biases the cone clutch friction member 28 towards a clutch engaged position (see arrow 36 in FIG. 2). When pressure within the pressure chamber 20 is released, the clutch spring 34 moves the cone clutch friction member 28 into the clutch engaged position 36 and the translatable clutch piston 24 moves into the piston neutral position. The clutch spring 34 also provides a maximum spring force which in turn translates into a clutch engagement force between the cone clutch friction member 28 and the rotating drive shaft member 32. This force prevents slippage between the member 28 and the drive shaft member 32.

A needle bearing member 50 is positioned in between the rotating drive shaft member 32 and the cone clutch friction member 28. The needle bearing member 50 preferably is a dual needle bearing member with a first needle bearing 54 and a second needle bearing 56.

In conventional airactuated cone clutches, the friction member is a solid ring of friction material having a tapered or frustoconical cross-section. The friction member is held in place against the inner surface of the outer drum housing member. In contrast, with the present invention, improved friction members are provided which are less expensive and easier to manufacture. The embodiment of the present invention also allow the rotating drive shaft member to have an increased diameter, which allows the clutch assembly to be stronger and have increased torque and capacity over the prior art.

In a first embodiment of the invention, as shown in FIGS. 1 and 2, the friction member is a V-shaped frustoconical member 28 having dry friction material 60 molded onto the inner 68 and outer surfaces 64 of the V-shaped member 28. The V-shaped member also is cone shaped and can be made of a strong and durable material, such as steel, aluminum or high strength polymer. The core 66 of the member 28 can either be hollow (as shown), or solid.

The V-shaped member is held in place axially by plate member 70 which is secured to the housing 29 by a plurality of fasteners 72.

Due to the construction of the V-shaped member 28, it can be made smaller from the solid rings in the prior art which are made entirely of friction material. This allows the diameter of the drive shaft member 32 to be increased. This, in turn, allows the clutch assembly 10 to have more torque to provide a stronger clutch with more capacity in a clutch housing having the same external size and shape as the prior art.

Figure 4:
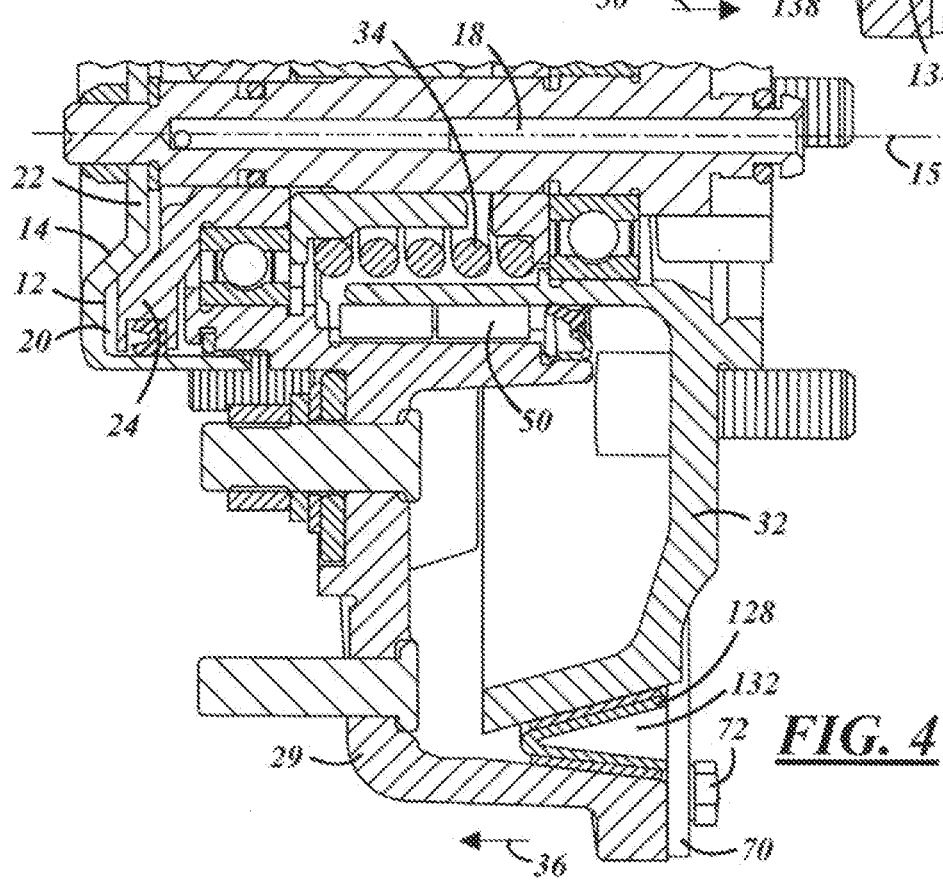
FIG. 4 illustrates the cone clutch fan drive of FIG. 3 with the clutch assembly illustrated in the clutch engaged position.

FIGS. 3 and 4 depict a second embodiment of the invention. In this embodiment, the cone shaped friction member 128 is made of a formed piece of metal material 130 with a hollow center area 132 and pieces of friction liner material 134 secured to the inner 136 and outer 138 surfaces of the member 128. The friction material 134 can be a 360° continuous strip of material, or it can be segmented and made of a plurality of pieces or sections spaced on the surfaces 136 and 138. In this regard, any conventional friction liner material of any conventional size and shape can be utilized with this embodiment of the invention.

Similar to the embodiment of friction member 28 described above with reference to FIGS. 1 and 2, the construction of this second embodiment of friction member 128 can be made smaller than the solid rings of friction material provided in the prior art pneumatic clutches. This allows the drive shaft member 32 to have an increased diameter thereby providing a clutch assembly with increased strength and torque, but with the same overall size and shape.

Figure 5:
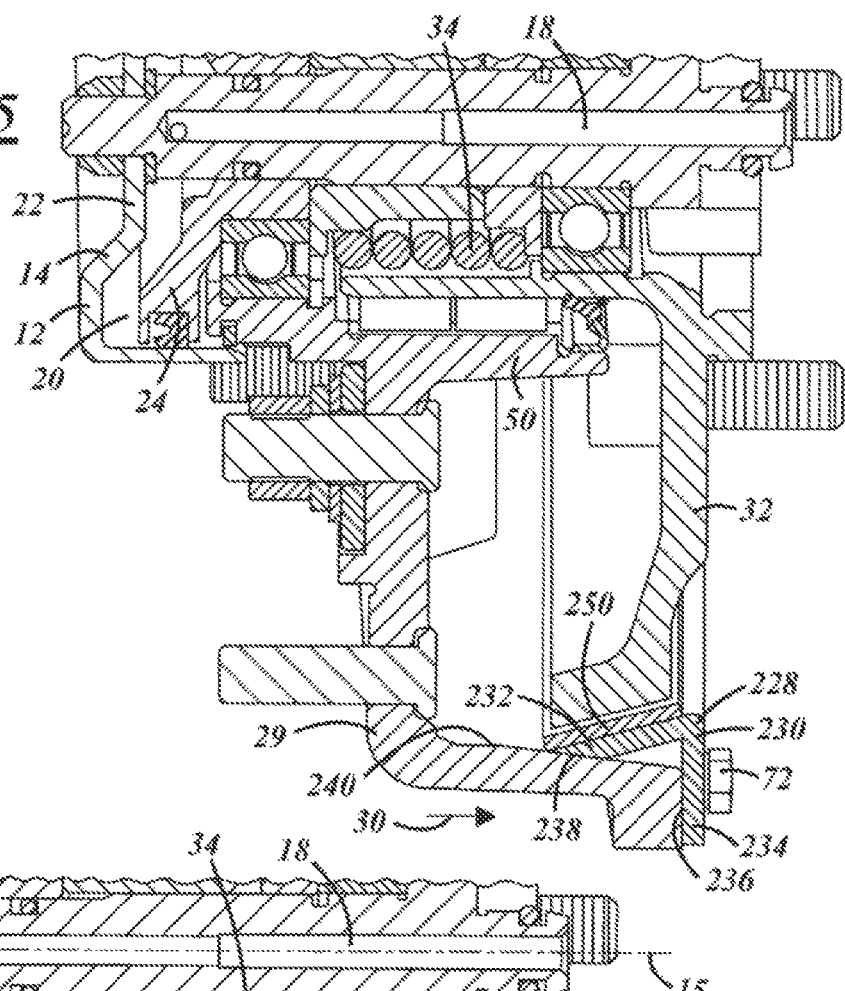
FIG. 5 illustrates a third embodiment of the invention, with the clutch assembly illustrated in the clutch disengaged position.
Figure 6:
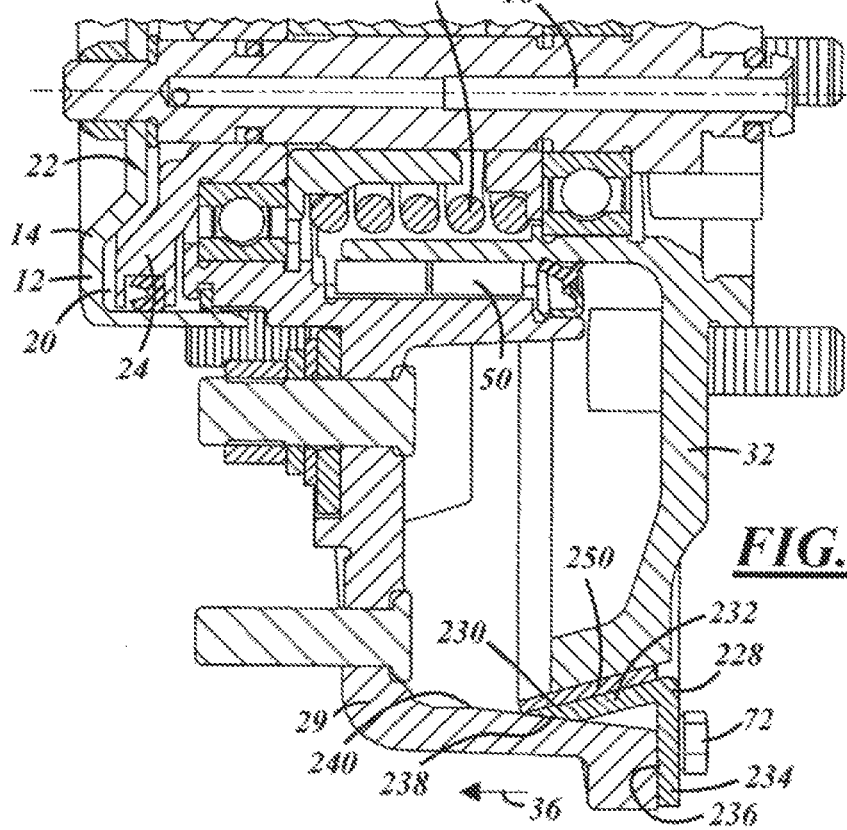
FIG. 6 illustrates the cone clutch fan drive of FIG. 5 with the clutch assembly illustrated in the clutch engaged position.

A third embodiment of the invention is shown in FIGS. 5 and 6. In this embodiment, the cone shaped friction member 228 is made of a bent piece of metal material 230, preferably of steel or aluminum. The metal material also has a generally V-shape, but has one leg member 232 positioned inside the housing 29 and the second leg member 234 positioned on the outer surface 236 of the housing. The friction member 228 is held in place by one or more fasteners 72, such as bolts. A separate retaining plate is not needed.

The inner end 238 of member 228 is formed at an angle such that the end contacts flush with the inner surface 240 of the housing 29. This provides strong support for the friction member and prevents the end from moving or sliding along, the surface 240 when the clutch is engaged.

A friction liner material 250 is securely affixed to the inner surface of the inner leg member 232. The friction liner can be made of any conventional friction liner material and be secured in any conventional manner, such as by bonding. The friction liner 250 also can be one continuous 360° piece of material, or segmented into numerous pieces or sections.

Due to the structure and construction of the friction member 228, it is larger in inner diameter and radial distance than friction members used in prior art pneumatic clutches. This in turn allows the diameter of the drive shaft member 32 to be increased resulting in a clutch assembly with increased strength and torque in the same size and shape package.

The increase in torque is shown by the following formula:

$$\text{Torque} = \frac{(\mu \cdot F)}{2(\sin\alpha)} \times \frac{(D + d)}{2}$$

where μ is the coefficient of friction, F is the axial force, α is the friction angle, D is the major contact diameter, and d is the minor contact diameter.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A clutch assembly for a fan drive system, the clutch assembly comprising:
   a clutch housing assembly;
   a central piston chamber feeding a pressure chamber;
   a translatable clutch piston positioned within said clutch housing assembly and in communication with said pressure chamber, said translatable clutch piston movable between a piston neutral position and a piston activated position, wherein air pressure fed through said central piston chamber into said pressure chamber is configured to move said translatable clutch piston from said piston neutral position toward said piston activated position;
   a rotating drive shaft member positioned within said clutch housing assembly;
   a cone clutch friction member in communication with said translatable clutch piston such that said cone clutch friction member is moved from a clutch engaged position to a clutch disengaged position in response to said translatable clutch piston moving from said piston neutral position to said piston activated position, said cone clutch friction member engaging said rotating drive shaft member when in said clutch engaged position;
   a clutch spring biasing said cone clutch friction member into said clutch engaged position with a clutch engagement force;
   said clutch assembly having a longitudinal axis;
   said clutch housing assembly having a clutch housing with a first flange member at a radially interior end thereof, said first flange member positioned at a first angle relative to said longitudinal axis;
   said rotating drive shaft member having a second flange member at a radially exterior end thereof, said second flange member positioned at a second angle relative to said longitudinal axis;
   said first flange member and said second flange member defining a wedge-shaped gap for positioning of said cone clutch friction member;
   said cone clutch friction member comprising an annular V-shaped metal member and a friction material;
   said V-shaped metal member being a one-piece member with a first portion and a second portion, said first portion positioned in said wedge-shaped gap and said second portion positioned outside said wedge-shaped gap and secured to said first flange member on said clutch housing;
   said friction material positioned on said first portion for contacting said second flange member during engagement of said clutch assembly;
   wherein a smaller radially wedge-shape gap is created allowing an increased diameter of said rotating drive shaft member and increased torque and capacity of said clutch assembly without increasing the external size or diameter of said clutch assembly.

2. The clutch assembly of claim 1, wherein said friction material comprises a plurality of separate pieces of friction material.

3. The clutch assembly of claim 1, wherein said V-shaped metal member is secured to said clutch housing by a plurality of fastener members.

4. A clutch assembly for a fan drive system, the clutch assembly comprising:
   a drive shaft that is rotatable about a rotary axis, the drive shaft comprising a first clutch member having a first frusto-conical friction surface that converges toward the rotary axis in a first axial direction along the rotary axis;
   a clutch housing assembly having a housing member and a friction material support member, the housing member being rotatable about and axially movable along the rotary axis, the friction material support member being fixedly but removably coupled to the housing member and defining a second frusto-conical surface that is disposed concentrically about the first frusto-conical friction surface, the second frusto-conical friction surface converging toward the rotary axis in the first axial direction along the rotary axis;
   a friction member fixedly coupled to the second frusto-conical friction surface so that the friction member is rotationally and axially fixed to the friction material support member prior to assembly of the friction material support member to the housing member;
   a clutch spring biasing the housing member along the rotary axis in a direction away from the drive shaft; and
   a piston received in the clutch housing assembly, the piston being coupled to the housing member for translation between a first piston position and a second piston position, wherein the friction member is engaged to the first frusto-conical surface when the piston is in the first piston position, and wherein the friction member is spaced apart from the first frusto-conical friction surface when the piston is positioned in the second piston position so that rotary power is not transmitted through the clutch assembly.

5. The clutch assembly of claim 4, wherein the friction member is formed of a friction liner material.

6. The clutch assembly of claim 5, wherein the friction member is formed of a single strip of the friction liner material.

7. The clutch assembly of claim 4, wherein the friction member has a uniform thickness where it contacts the first and second frusto-conical surfaces.

8. The clutch assembly of claim 4, wherein the clutch housing assembly includes a plurality of threaded fasteners that extend through an annular flange formed on the friction material support member and threadably engage the housing member.

9. The clutch assembly of claim 8, wherein the housing member contacts a radially outer edge of an axial end of the friction material support member that is opposite the annular flange.

10. The clutch assembly of claim 4, wherein the clutch housing assembly further comprises a cap that is sealingly engaged to the housing member, and wherein the cap defines a piston cavity into which the piston is received.

11. The clutch assembly of claim 4, wherein the friction member is bonded to the second frusto-conical friction surface.

12. The clutch assembly of claim 4, wherein the friction material support member is formed of aluminum.

13. The clutch assembly of claim 4, wherein movement of the piston between the first and second piston positions translates the friction member axially along the rotary axis a distance that is less than or equal to 0.15 inch.

14. The clutch assembly of claim 13, wherein the distance is greater than or equal to 0.05 inch.

15. The clutch assembly of claim 4, wherein a pair of needle bearings are received between the housing member and the drive shaft.

16. A clutch assembly for a fan drive system, the clutch assembly comprising:
   a drive shaft that is rotatable about a rotary axis, the drive shaft comprising a first clutch member having a first frusto-conical friction surface;
   a clutch housing assembly having a housing member and a friction support member, the housing member being rotatable about and axially movable along the rotary axis, the friction material support member having an annular flange, which is fixedly but removably coupled to the housing member with a plurality of threaded fasteners, and a frusto-conical portion that is fixed to the annular flange;
   a friction member formed of a flat strip of a friction liner material, the friction member being fixedly coupled to the frusto-conical portion so that the friction member is rotationally and axially fixed to the annular flange prior to assembly of the friction support member to the housing member;
   a clutch spring biasing the housing member along the rotary axis in a direction away from the drive shaft; and
   a piston received in the clutch housing assembly, the piston being coupled to the housing member for translation between a first piston position and a second piston position, wherein the friction member is engaged to the first frusto-conical surface when the piston is in the first piston position, and wherein the friction member is spaced apart from the first frusto-conical friction surface when the piston is positioned in the second piston position so that rotary power is not transmitted through the clutch assembly.

17. The clutch assembly of claim 16, wherein the housing member contacts a radially outer edge of an axial end of the friction material support member that is opposite the annular flange.

18. The clutch assembly of claim 16, wherein the clutch housing assembly further comprises a cap that is sealingly engaged to the housing member, and wherein the cap defines a piston cavity into which the piston is received.

19. The clutch assembly of claim 16, wherein the friction member is bonded to the frusto-conical portion.

20. The clutch assembly of claim 16, wherein the friction material support member is formed of aluminum.

21. The clutch assembly of claim 16, wherein movement of the piston between the first and second piston positions translates the friction member axially along the rotary axis a distance that is less than or equal to 0.15 inch.

22. The clutch assembly of claim 21, wherein the distance is greater than or equal to 0.05 inch.

23. The clutch assembly of claim 16, wherein a pair of needle bearings are received between the housing member and the drive shaft.

* * * * *